United States Patent [19]

Poulo et al.

[11] Patent Number: 5,111,133
[45] Date of Patent: May 5, 1992

[54] CONVERTER CIRCUIT FOR CURRENT MODE CONTROL

[75] Inventors: Louis R. Poulo, Andover; James G. Staley, Stow, both of Mass.

[73] Assignee: Analogic Corporation, Peabody, Mass.

[21] Appl. No.: 589,068

[22] Filed: Sep. 27, 1990

[51] Int. Cl.$^5$ .............................................. G05F 1/46
[52] U.S. Cl. ................................... 323/286; 323/288; 363/16; 363/124
[58] Field of Search ............... 323/282, 283, 284, 285, 323/286, 287, 288; 363/16, 97, 124

[56] References Cited

U.S. PATENT DOCUMENTS

| | | |
|---|---|---|
| 3,294,981 | 12/1966 | Bose . |
| 3,418,495 | 12/1968 | Bose . |
| 3,657,569 | 4/1972 | Froeschle . |
| 4,206,417 | 6/1980 | Poulo . |
| 4,288,738 | 9/1981 | Rogers et al. ................ 323/288 |
| 4,425,613 | 1/1984 | Shelly . |
| 4,456,872 | 6/1984 | Froeschle . |
| 4,533,986 | 8/1985 | Jones ................ 323/266 |
| 4,672,303 | 6/1987 | Newton ................ 323/288 |
| 4,801,859 | 1/1989 | Dishner ................ 363/16 |
| 4,829,259 | 5/1989 | Konopka . |
| 4,841,207 | 6/1989 | Cheyne . |
| 4,849,651 | 7/1989 | Estes, Jr. ................ 363/16 |
| 4,885,522 | 12/1989 | Konopka . |
| 4,902,944 | 2/1990 | Daggett et al. . |

OTHER PUBLICATIONS

Unitrode Integrated Circuits of Merrimack, NH, "Modelling Analysis and Compensation of the Current-Mode Converter", U-97 (pp. 9-87 through 9-92) and U-100A (pp. 113-115).

*Primary Examiner*—Peter S. Wong
*Attorney, Agent, or Firm*—Schiller & Kusmer

[57] ABSTRACT

A converter circuit operable in a current control mode is disclosed. The circuit is of the type including an (1) inductor, (2) a clock for providing a clocking signal so that the circuit operates as a synchronous converter and (3) switching means, responsive to the clocking signal and a threshold current, for controlling the load voltage across the inductor between at least two different levels of voltage as a function of one or more supply voltages so that the inductor conducts (a) increasing inductor current for one level of load voltage from the beginning of each cycle of the clocking signal until the inductor current equals the threshold current during each cycle, and (b) decreasing inductor current for the other level of voltage from the time in each cycle the current equals the threshold current until the end of each said cycle. The threshold current is generated as a function of the load and supply voltages so that the slope and level of the threshold current is the desired steady state solution of the decreasing inductor current so that any perturbations of the inductor current immediately converges to the steady state solution at the time in each cycle the current equals the threshold current, and compensation is provided so that the average current passing through the inductor is substantially independent of the supply and load voltages.

11 Claims, 4 Drawing Sheets

CONVERTER CIRCUIT FOR CURRENT MODE CONTROL

BACKGROUND OF THE INVENTION

The present invention is directed to control circuits, and more particularly to an improved synchronous control circuit for providing accurate current control outputs.

The following U.S. Patents were considered during the preparation of the present disclosure: U.S. Pat. Nos. 3,294,981; 3,418,495; 3,657,569; 4,206,417; 4,425,613; 4,456,872; 4,829,259; 4,841,207; 4,885,522; and 4,902,944.

Figure 1:
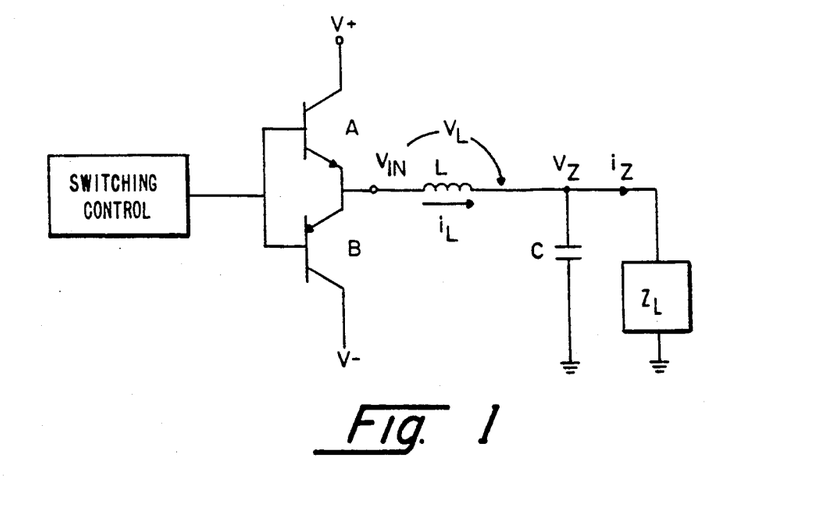
FIG. 1 is a schematic view of a typical half bridge current control of the prior art.
Figure 2A:
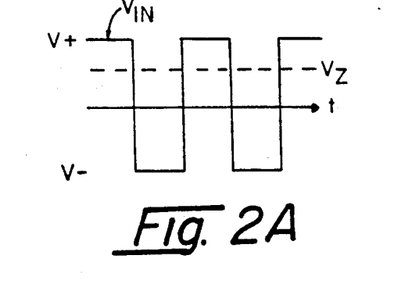
FIGS. 2(a) and 2(b) are graphical representations of examples of the voltage at the input of the inductor L shown in FIG. 1.
Figure 3:
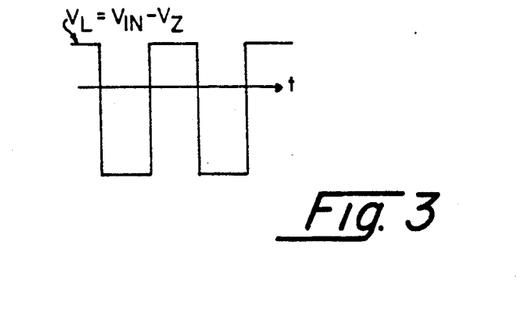
FIG. 3 is a graphical representation of the voltage $V_L$ across the inductor L shown in FIG. 1 in response to the voltage shown in FIG. 2(a)
Figure 4A:
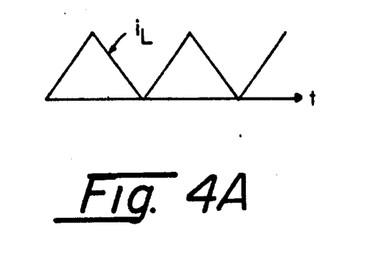
FIGS. 4(a) and 4(b) are graphical representations of the current through the inductor L shown in FIG. 1 in response to the voltages shown in FIGS. 2(a) and 2(b), respectively, at the input of the inductor.

Various control circuits designed specifically for current mode control have recently been developed because of the various advantages of current mode control over conventional voltage mode control. A basic control circuit for current control is illustrated in FIG. 1. The circuit is shown as a half bridge circuit for illustrative purposes, it being understood that DC regulator and full bridge circuits are equally well known, as will be more fully evident hereinafter. As shown in FIG. 1, a pair of transistor switches A and B are alternately turned on and off so that the V+ and V− supply rails are alternately connected through the inductor L to a low pass filter C so as to generate the square wave Vin at the input of the inductor as shown in FIG. 2(a). Since there can be high dissipation losses of energy across the transistors when they are being switched between the open and closed states the switching should occur as quickly as possible to minimize this dissipation, with FIG. 2(a) showing the switching occurring with no dissipation and thus in an idealized form. As the transistors A and B alternately switch on and off by the switcher control, a square wave voltage $V_L$ is provided across the inductor, as indicated in FIG. 3, wherein $V_L$, the voltage, across the inductor is simply $V_{in}$ minus the voltage output of the LC filter, $V_Z$. $V_Z$ is substantially constant relative to the switching frequency although it is slowly varying at the low base-band frequencies passed by the low pass filter C. Thus, as described herein within each cycle of the switching frequency the signal is considered substantially constant so that it functions as an offset to the $V_{in}$ voltage. The current through the inductor, shown as $i_L$ in FIG. 4(a), will thus ramp up when $V_L$ is positive and ramp down when $V_L$ is negative, thereby producing the triangular waveform.

Figure 2B:
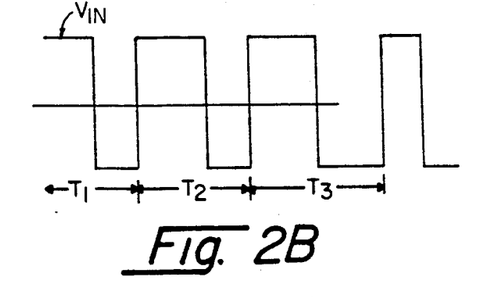
Figure 4B:
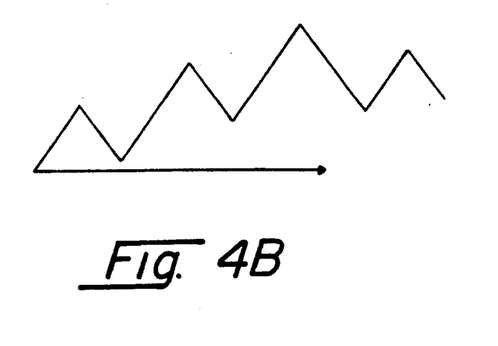

The switching circuit can be operated either at a fixed frequency, where the period of the triangular wave is fixed, or at a variable frequency, wherein the period of the triangular wave can vary. If during an on-off cycle the transistor A is on longer than the transistor B, the positive portion of the cycle will be greater than the negative portion, as indicated in FIG. 2(b). Conversely, during the on-off cycle transistor A is on for less time than transistor B, the positive portion of the cycle will be less than the negative portion. Consequently, the time the inductor current ramps up during a cycle will likewise vary, as illustrated in FIG. 4(b). The duty cycle (the amount of time the switch A is on during each period of the triangular wave) can be controlled to provide a duty cycle modulator.

In many instances, for example in a current supply for the gradient coils of an MRI system, it is desirable that the triangular waveform be such that the resulting average base-band current of the waveform provided to the load $Z_L$ in FIG. 1 follows a given or prescribed slowly varying input signal (and yet remain substantially constant within cycle) so that the power delivered to the coils remains substantially fixed. However, the average current can vary with variations in the supply voltages (V+ and V−), the load voltage $V_L$ across the inductor, variations in the maximum and minimum peak values of the triangular current provided through the inductor L, and variations in the frequency and duty cycle of the triangular waveform.

Figure 5:
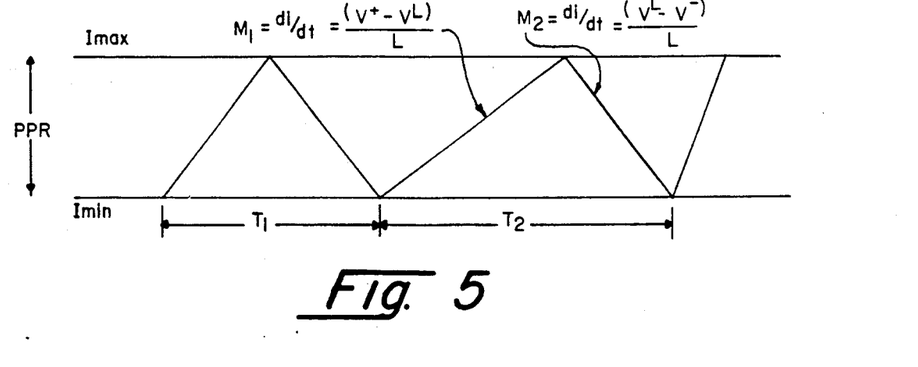
FIG. 5 is a graphical representation of the current through the inductor shown in FIG. 1 having fixed maximum and minimum values and varying in period length in response to changes in the supply voltages.

Various approaches fix one of these variables but are unsuccessful in fixing the other variables. For example, fixing the maximum and minimum peak values, i.e., the peak to peak ripple (PPR), for each cycle of the triangular wave output, as indicated by FIG. 5 would fix the average current value, but would require the length of the on and off portions of each period to vary (as illustrated by the two successive, but different periods T1 and T2 of FIG. 5) as the supply voltages V+ and V− vary since the positive slope $m_1$ of the triangular wave (di/dt) is a function of $(V+ - V_L)/L$, while the negative slope $m_2$ is a function of $(V_L - V-)/L$. Thus, as the supply voltages vary, the positive and negative slopes of the triangular current waveform vary so that the frequency of the waveform varies. The same results occur where one of the peaks If instead of controlling the upper and lower peak current values, one or the other is fixed as a defined switching threshold, the switching frequency may also be synchronized to an external clock. However, in the latter case, the average output current will change if the load and power supply voltages change. Referring to FIG. 4(b), the latter shows a more general example of inductor current changes as a function of inductor voltage when the duty-cycle and period of the waveform changes. The waveforms shown in FIG. 4(b), the latter shows a more general example of inductor current changes as a function of inductor voltage when the duty-cycle and period of the waveform changes. The waveforms shown in FIG. 4(b) are not necessarily associated with any particular control scheme.

In addition other problems arise with current mode converters. For example, as described in Application Note "Modelling, Analysis and Compensation of the Current-Mode Converter" U-97 (pp. 9-87 through 9-92) and U-100A (pp. 113-115) published by Unitrode Integrated Circuits of Merrimack, NH (hereinafter the "Application Note"), at least in the case of synchronous, peak current sensing, current mode converters other disadvantages include (1) open loop instability above 50% duty cycle, (2) less than ideal loop response caused by peak instead of average inductor current sensing, (3) tendency towards subharmonic oscillation, and (4) noise sensitivity, particularly when inductor ripple current is small.

Figure 6:
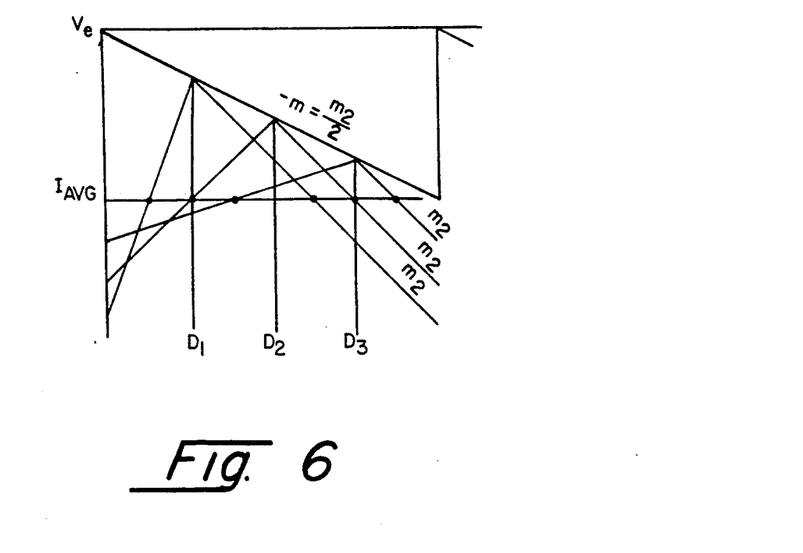
FIG. 6 is a partial schematic, partial block diagram of a prior art DC regulator.
Figure 7:
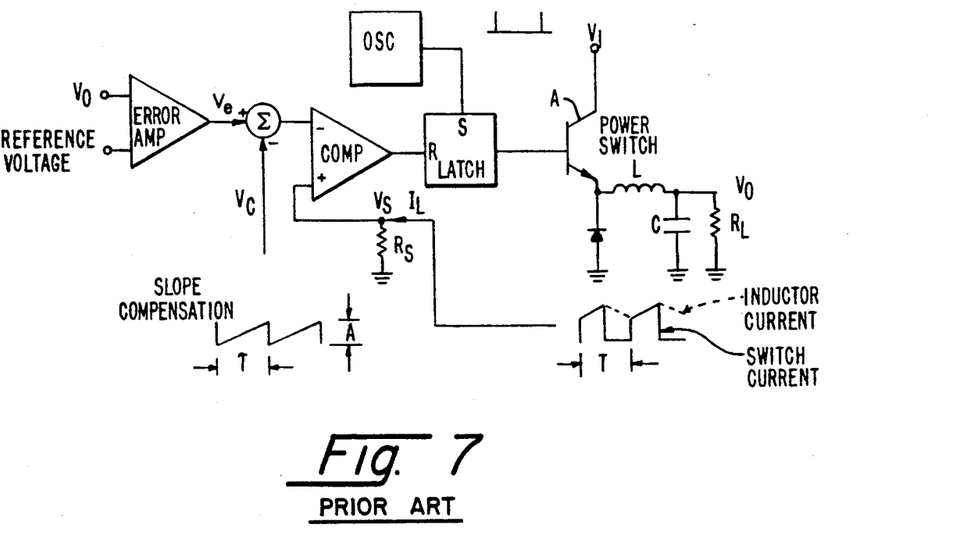
FIG. 7 is a graphical illustration of waveforms generated by the FIG. 6 circuit.

Accordingly, one approach to solve at least some of the above-noted problems is described in the Application Note. Specifically, a compensating signal is provided having an amplitude over the period of the clocking cycle which decreases at a linear rate (slope "m") at one-half the desired slope "$m_2$" of the negative going portion of the steady state waveform as best seen in FIG. 6. The DC voltage regulator circuit described in the Application Note is reproduced in FIG. 7. The compensating signal is provided by the single resistor Rs at the non-inverting input of the comparator shown at COMP. The compensating signal is used to define the peak current at which the transistor A is switched from on to off so that as the duty cycle increases the peak current at which the transistor switches decreases. In this way the peak switching current is a function of the duty cycle. The article suggests that providing the compensating signal provides a constant average current regardless of the duty cycle as shown in FIG. 6. Further, the linear ramp of the compensating signal insures convergence of the current waveform even when the duty cycle is over 50% although the convergence takes place over several cycles with the circuit approaching instability (subharmonic oscillations) at a duty cycle of 1. Thus, some undesirable ringing takes place.

The Application Note suggests that in order to insure current loop stability and improve dynamic performance, the slope m of the compensation ramp can be increased greater than one-half of the negative slope $m_2$ of the steady state current waveform to minimize ringing, with the best possible transient response occurring when the slope m of the compensation signal is set to be equal to the negative slope $m_2$ of the inductor current ramp, which is analogous to critically damping the inductor current, allowing the current to correct itself in exactly one cycle. But the article states that while this minimizes inductor current ringing, it has little bearing on the transient response of the voltage control loop itself since it will not provide the constant average current achieved by the $m=m_2/2$ solution.

Several observations can be made about the above approach. First, the choice of the slope of the compensating signal is a tradeoff between good average current tracking (requiring a setting of the slope $m=m_2/2$), and good dynamic performance of the circuit (requiring a setting of the slope $m=m_2$). Secondly, as a DC regulator the slope $m_2$ is treated as fixed since it is solely dependent on input and load voltages. Specifically, as shown the slope $m_2$ is shown as always being the same, irrespective of the slope $m_1$ so that the average current can be maintained constant irrespective of the slope $m_1$. It is not apparent from the description of the compensation circuit in the Application Note that the slope of the compensation signal will adapt to changes in $m_2$ which can be brought about with fluctuations in the input and load voltages in the case of the DC regulator and additionally, the negative voltage rail $V^-$ in the case of the half or full bridge. Finally, while the comparisons are made between the $m=m_2$ and $m=m_2/2$ solutions, it is not clear that using the resistor $R_s$ will provide the desired steady state solution, not only in terms of the slope $m_2$, but also the amplitude level of the sloped portion of the signal.

OBJECTS AND SUMMARY OF THE INVENTION

It is an object of the present invention to provide an improved current converter adapted to minimize or substantially overcome the above-noted disadvantages.

Another object of the present invention is to provide an improved current converter exhibiting both good dynamic performance and good average current tracking.

Another object of the present invention is to provide an improved current converter for generating a synchronous controlled current output and adapted to provide compensation in its output in response to changes in input, load and supply voltages so as to maintain good dynamic performance as well as good average current tracking regardless of changes in such voltages.

And yet another object of the present invention is to provide an improved current converter for generating a synchronous controlled current output and adapted to generate a compensation signal representative of both the level and slope of the desired steady state solution of the control current output.

These and other objects of the present invention are achieved by a improved current converter circuit operable in a current control mode. The circuit is of the type including (1) an inductor, (2) a clock for providing a clocking signal so that the circuit operates as a synchronous converter and (3) switching means responsive to the clocking signal and a threshold current, for controlling the voltage at one end of the inductor between at least two different levels of voltage as a function of one or more supply voltages so that the inductor conducts (a) increasing inductor current for one level of load voltage from the beginning of each cycle of the clocking signal until the inductor current equals the threshold current level during each cycle, and (b) decreasing inductor current for the other level of voltage from the time in each cycle the current equals the threshold current until the end of each said cycle.

The threshold current is generated as a function of the load and supply voltages so that the slope and level of the threshold current is the desired steady state solution of the decreasing inductor current so that any perturbations of the inductor current immediately converges to the level and slope of the steady state solution at the time in each cycle the current equals the threshold current, and compensation is provided so that the average current passing through the inductor is substantially independent of the supply and load voltages.

Other objects of the present invention will in part be obvious and will in part appear hereinafter. The invention accordingly comprises the apparatus possessing the construction, combination of elements, and arrangement of parts exemplified in the following detailed disclosure, and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

In the drawings the same numerals are used to designate similar parts.

Figure 8:
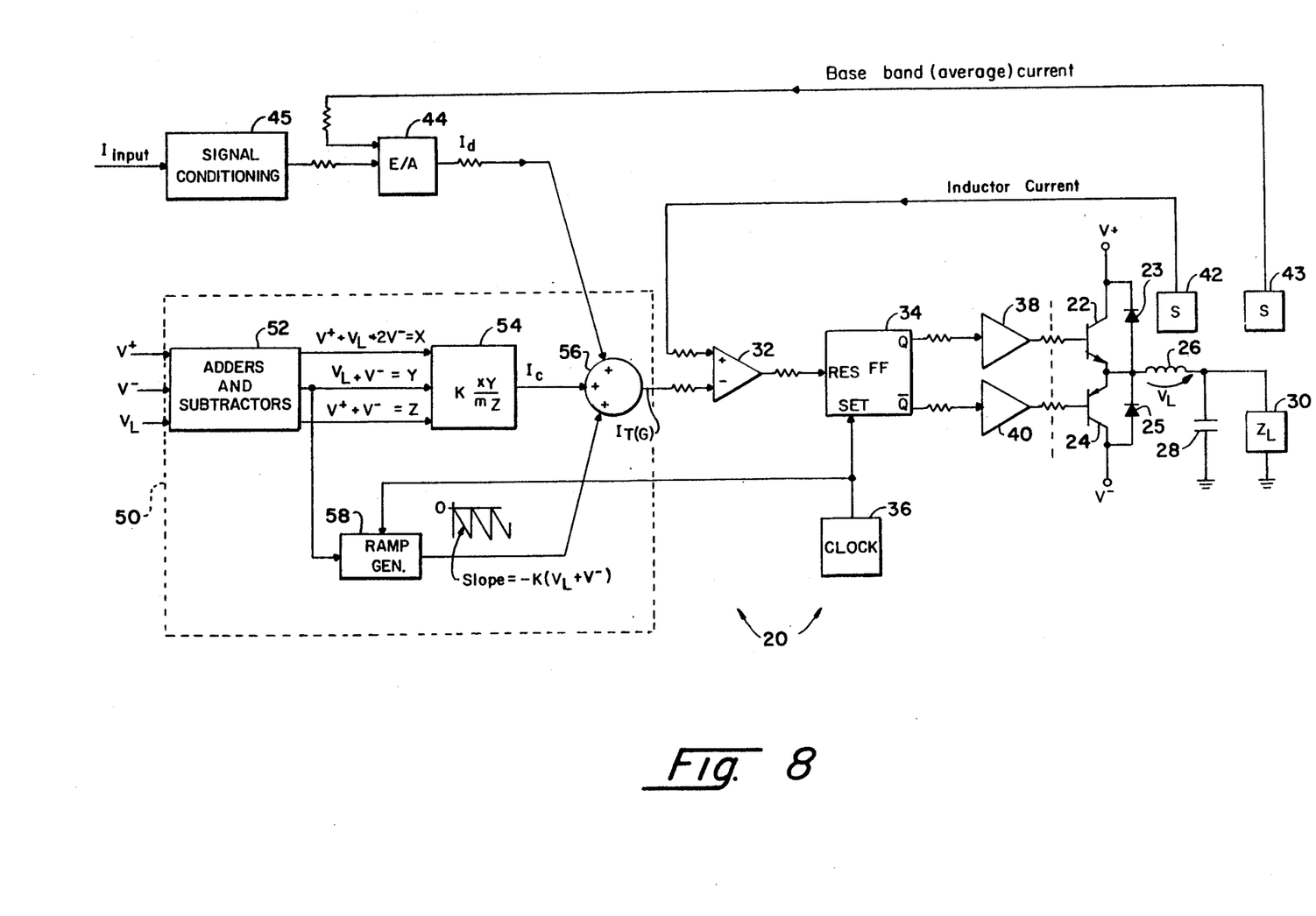
FIG. 8 is a partial schematic, partial block diagram of the preferred embodiment of the synchronous current converter including the improved switching control in accordance with the teachings of the present invention.

As shown in FIG. 8 the circuit 20 of the present invention is shown as a half bridge, it being understood that the principles of the present invention can also be applied to other types of switching circuits including DC regulators and full bridge circuits. The circuit 20 includes the switches in the form of transistors 22 and 24 connected to the inductor 26, with the transistors being adapted to transmit current from the positive voltage rail $V^+$ to the inductor 26 when transistor 22 is conducting, and transmit current from the inductor to the negative voltage rail $V^-$ when the transistor 24 is conducting. In addition "free wheeling" diodes 23 and 25 are connected across the respective emitters and collectors of corresponding transistors 22 and 24, so as to permit bipolar current flow as is well known. As in the prior art the inductor 26 is connected through the capacitor 28 to system ground so that the capacitor functions with the impedance load 30 as a low pass filter and only the base-band portion of the current generated through the inductor 26 is provided to the impedance load 30. The circuit 20 also includes a comparator 32 having one input (e.g., its inverting input as shown in FIG. 8) connected to receive the analog input signal. The output of the comparator is connected to the reset input of the flip flop 34, the latter having its clocking input connected to receive a clocking signal at a fixed clocking frequency from clock 36. The Q output of the flip flop 34 is connected through a buffer amplifier 38 to the base of transistor 22, while the $\bar{Q}$ output of the flip flop is connected through a buffer amplifier 40 to the base of transistor 24. As is well known the current through the inductor 26 is sensed (as for example using a Hall effect sensor 42) and provided as a feed back current to the noninverting input of the comparator 32. It should be understood that while devices 32, 38 and 40 are typically voltage devices, with proper scaling resistors at the inputs and outputs of the devices the input and output signals can be described as either voltages, or currents.

In addition, a desired baseband current input $I_d$ can be provided from the output of an error amplifier 44 generated as a function of the difference between some input current $I_{input}$ (which can slowly vary over time within the base-band of frequencies defined by the filter formed by capacitor 28 and impedance load 30) provided through conditioning circuitry 45 to one input of error amplifier 44, and the base-band load current sensed by the sensor 43 (which also may be a Hall effect sensor) from the output of the filter formed by the capacitor 28 and impedance load 30. To the extent described, thus far, the circuit 20 is the same as a certain type of prior art device.

In developing an improved synchronous current converter exhibiting both good dynamic performance and good average current tracking, it is the preferred approach to generate a compensating signal which is added to the desired current signal $I_d$ so that the analog input to the comparator 32 adapts to changes in the supply and voltages loads ($V^+$, $V^-$, and $V_L$) in addition to those changes in the input voltage (or current). The compensating signal is preferably provided as a ramp signal having an identical slope m to the steady state slope $m_2$ of the negative ramp portion of the steady state signal so as to provide fast dynamic response within a single cycle to the steady state solution. As will be more evident hereinafter, since the ramp signal can be at the correct slope of the steady state solution but at any level, an additional correction signal $I_c$ is generated and added to the ramp signal to form the compensating signal so that the compensating signal is at the correct level of the desired steady state solution. The slope and level of the ramp of the compensating signal varies with changes in the slope and level of the desired steady state solution in response to changes in the supply, load and input voltages so as to maintain a constant average current.

Figure 10:
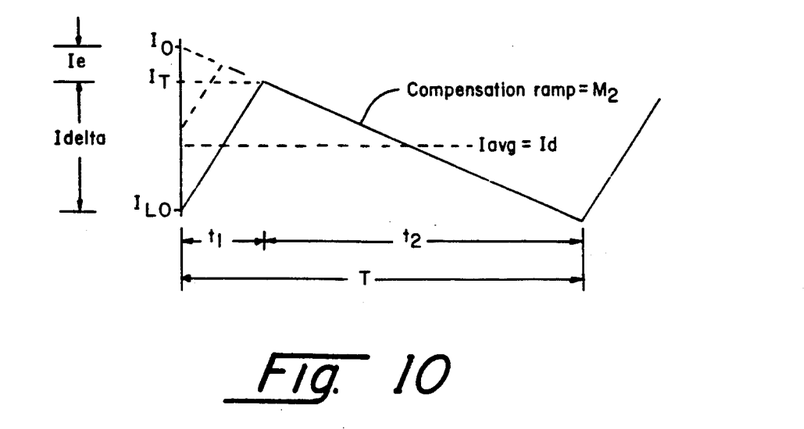
FIG. 10 is another illustration of the steady state inductor current with the negative slope back interpolated for an entire period for purposes of illustrating the present invention.

In developing a current control scheme satisfying the objects of the invention for the fixed frequency (synchronous) device shown in FIG. 8, and in particular the compensating signal, as described in reference to FIG. 10, each cycle will have a fixed period T, and it is initially assumed that the device will turn on, i.e., provide a positively increasing current though the inductor 26 of FIG. 8 at the beginning of each cycle for the t1 portion of the cycle, and turn off when the current reaches a maximum peak value or threshold, $I_T$. At that point in time of the cycle the current will ramp down until the end of the cycle for the remaining $t_2$ portion of the cycle. It should be appreciated that the time within each cycle that the maximum peak value is achieved may vary from cycle to cycle due to variations in the supply and load voltages.

Figure 9:
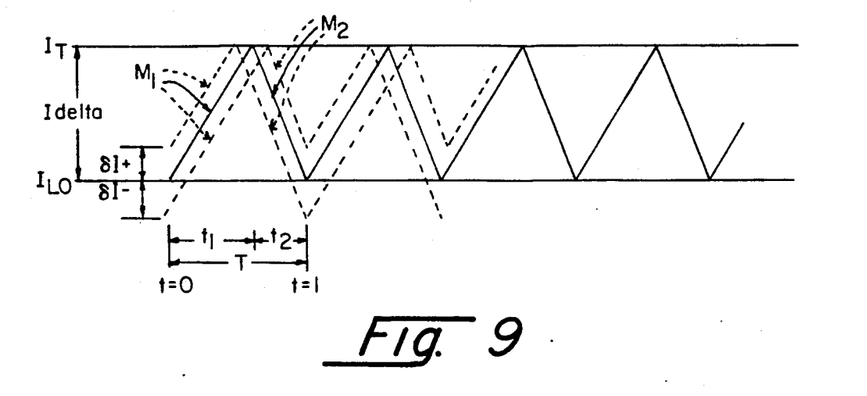
FIG. 9 is a graphical illustration of a comparison of the steady state inductor current and an error waveform for purposes of illustrating the operation of a synchronous control scheme with current-controlled upper threshold switching ("off") and synchronous "on" switching with no slope compensation so as to better understand the present invention.

However, three observations can be made. First, as shown in FIG. 9, ideally there is a steady state solution at which the current level $I_{LO}$ at the beginning and end of each cycle, and the time within each period t1 at which the current reaches the level $I_T$, will be the same from cycle to cycle. Secondly, it should be appreciated that for the steady state solution the average current is not the threshold level $I_T$, but one-half the peak to peak ripple, i.e., $(I_T - I_{LO})/2$, shown in FIGS. 9 and 10 as $I_{delta}$. Thirdly, the steady state solution is not inherently stable. In other words as shown in FIG. 9 if an initial error exists in $i_L$ (the current through the inductor), the operation will not necessarily converge to the steady state as described in the Application Note. A simple example is a subharmonic oscillation that oscillates about the steady state solution.

In analyzing the subharmonic oscillation of the steady state, or for that matter, any solution, the positive and negative slopes of the current through inductor 26 of FIG. 1, depend only on the voltage $V_L$ across the inductor, not on current level. This is a first order approximation which ignores losses, but accurate for loop stability of the feedback described in connection with FIG. 8 in most practical cases. As seen in FIG. 9, if an initial current $I_1$ is assumed to start out above the steady state solution at t=0, with the voltage $V_L$ positive, the current will ramp up at the same positive slope $m_1$ as the steady state solution. In actual operation it switches off (so that the current ramps down) sooner than that of the steady state. The slope $m_2$ of the ramp down is also the same as the steady state solution. However, at the end of the cycle the value of the current is less that provided by the desired steady state solution. In analyzing the error, the question is whether the current will eventually converge toward the steady state. In the example where the slopes $m_1$ and $m_2$ are maintained the error will repeat since the initial current value will be lower than the steady state solution at the beginning of the first cycle, and greater than the steady state solution at the beginning of the second cycle. This repeats for each successive two cycles so as to create a subharmonic at half the frequency of the waveform, and thus the subharmonic oscillation referred to above.

Thus, even though a steady state solution exists the circuit may continually hunt for that solution an never converge to that solution. Even if the current eventually converged toward the steady state, this can create ringing in the circuit at relatively lower frequencies than the switching frequency. So the two problems with this particular scheme are the fact that the steady state is not stable so that if there is an initial error it will not necessarily converge. Secondly, the average current will not be maintained at a fixed value, but will vary from cycle to cycle. Thus, as suggested in the Application Note, a current converter capable of providing convergence within one cycle of the waveform and provide good average current tracking must address both of these problems.

Thus, it is desirable to develop a compensation signal generator 50 as shown in FIG. 8 for providing both design objects of good dynamic performance and good average current tracking. As best shown in FIG. 10, to obtain a desired average value, Id, it is necessary to set the threshold IT above the value Id by an amount equal to one-half the peak to peak ripple PPR, or one-half $I_{delta}$, or $$I_T = I_d + PPR/2 \tag{1}$$

In a particular application the value of $I_d$ will be given and set by the $I_{input}$ signal. Accordingly, one-half the peak to peak ripple has to be determined in order to define the value of IT. PPR is a function of the positive and negative supply voltages V+ and V− and the load voltage $V_L$ of FIG. 8, with the period length T and the inductance value L of inductor 26 as parameters provided by a given circuit. The period T and the inductance L of inductor 26 do not change in an actual circuit, but as the operating conditions change, certainly the supply voltages V+, V− and the load voltage $V_L$ can change resulting in changes in the positive and negative ramps of the current waveform. It should also be observed that the steady state PPR is independent of the absolute level of $i_L$ or $I_T$ as a practical approximation.

Where the difference between $I_{LO}$ and $I_T$ at the beginning of a cycle is defined as $\delta I_+$, and the difference between $I_T$ and $I_{LO}$ at the end of a cycle is defined as $\delta I_-$, a condition for steady state is as follows:

$$\delta I_+ = \delta I_{31} \tag{2}$$

since the value of the current at the beginning of each cycle must match the value of the current at the end of each cycle as a definition of steady state.

Where t1 is the time of the period that the ramp is positively increasing and t2 is the time of the period that the ramp is negatively decreasing, and $m_1$ and $m_2$ are the corresponding slopes of the two ramps, then for steady state conditions $$m_1 t1 = -m_2 t2 = PPR = I_{delta} \tag{3}$$

wherein $m_2$ is a negative number.

Since $m_1$ and $m_2$ (di/dt) can be defined in terms of L the voltage across the inductor L, the slopes are more specifically defined in terms of the supply and load voltages as follows:

$$m_1 = (V^+ - V_L)/L \tag{4}$$

$$m_2 = -(V^- - V_L)/L = (V_L - V^-)/L \tag{5}$$

Thus, while the values of t1, t2 and $I_{delta}$ are relatively unknown, the source and load voltages are known so that the values of t1, t2 and $I_{delta}$ can be calculated as follows:

$$t1 = [(V_L + V^-)/(V^+ + V^-)]T \tag{6};$$

$$t2 = [(V^+ - V_L)/(V^+ + V^-)]T; \tag{7}$$

$$I_{delta} = PPR = m_1 t1 = -m_2 t2 = (V^+ - V_L)(V_L + V^-)T/L(V^+ + V^-) \tag{8}$$

Referring to equations (1) and (8) and substituting:

$$I_T = I_d + (V^+ - V_L)(V_L + V^-)T/2L(V^+ + V^-) \tag{9}$$

wherein the final term $(V^+ - V_L)(V_L + V^-)T/2L(V^+ + V^-)$ is defined as the correction term PPR/2.

While the correction term provides the correct $I_{avg}$ of the steady state solution Id, it does no better than the original in forcing convergence to the steady state solution since the level of the desired steady state solution is not provided. Accordingly, in order to force convergence at the desired level, it is first necessary to calculate the value of current $I_o$ (the current level of the desired steady state solution ramp at time t=0 at the beginning of each cycle) shown in FIG. 10 by extrapolating the negative ramp backwards in time given that the minimum value of current $I_{LO}$ is known and the negative slope $m_2$ is known. If $I_e$ represents the difference between $I_o$ and the peak steady state level and is defined by:

$$I_e = -m_2 t1 \tag{10}$$

the initial ramp value $I_o$ can be defined as:

$$I_o = I_{avg} + I_c \tag{11}$$

wherein $I_c = I_e + PPR/2$, the current generated by generator 50.

Equation (11) becomes:

$$I_o = I_{avg} + (V^+ + V_L + 2V^-)(V_L + V^-)T/2L(V^+ + V^-) \quad (12)$$

Thus, the actual compensation ramp starts at $I_o$ level at the beginning of each cycle and ramps down with the slope $m_2 = -(V_L + V^-)/L$.

Thus, referring to FIG. 8, the adders and subtractors circuit 52 is adapted to sense the values of $V^+$, $V^-$ and $V_L$ and provide the numerator terms $(V^+ + V_L + 2V^-)$ and $(V_L + V^-)$, and the denominator term $(V^+ + V^-)$. The analog multiplier/divider 54 multiplies the two numerator terms and divides the product by the denominator term. The multiplier/divider circuit 54 can be any device for performing the multiple functions. A constant $K_m$ equal to $T/2L$ is initially determined as a function of the inductance of the inductor 26 and the period T, and preprogrammed into the multiplier/divider. Thus, the current term $I_c$ is provided at the output of the multiplier/divider 54. Adding $I_d$ and $I_c$ at the summing junction 56 provides the initial value $I_o$ as a function of the supply and load voltages. In order to generate the ramp at the negative slope $m_2$, a ramp generator receives the value of slope $m_2$ as defined by the term $V_L + V^-$ at the output of the adders and subtractors circuit 52 and applies the signal to the input of a negative ramp generator 58. The latter generates a negative going ramp at the slope $m_2$ as a function of negative supply and load voltages $V^-$ and $V_L$. The generated ramp signal is reset for each clocking period T by the clock 36. The ramp signal is thus added to the $I_d$ and $I_c$ terms at the junction 56 so that the generated compensation signal is thus a function of $I_o$, the highest possible value of the negative going portion of the steady state ramp at the steady state slope $m_2$. Both $I_o$ and $m_2$ are derived as functions of the load and source voltages so that the compensation signal adapts to changes in those voltages. The output of the junction 56 is I(t) (the threshold current which decreases at a linear rate over the cycle period T) and is applied to the inverting input of comparator 32. The output of the junction applied to the inverting input will therefore provide the desired threshold current level which decreases over the cycle period.

Thus, any perturbations of the current from the steady state will thus provide convergence to the steady state within one cycle, and specifically when the transistor 22 turns off and switch 24 turns on, providing fast dynamic response. In addition the initial steady state solution will accommodate changes in supply and load voltages without effecting the desired average current $I_d$. The FIG. 8 circuit therefore has the advantage over the slope only solution proposed in the Application Note in that the FIG. 8 device provides both fast dynamic response within a single cycle and constant average current.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A converter circuit operable in a current control mode for controlling the current provided to a load, said circuit comprising:

inductance means, coupled to said load, for conducting a steady state waveform of inductor current having an increasing portion with a positive slope, a decreasing portion with a negative slope and an average value;

clocking means for generating a clocking signal at a predetermined frequency;

means for generating a threshold current at a predetermined slope and level;

means for generating a switching signal during each cycle of said clocking signal when the inductor current equals a threshold current level;

switching means, responsive to said clocking signal and said threshold current, for controlling the voltage at one end of said inductance means between two different levels of voltages respectively as a function of two supply voltages so that said inductance means conducts (1) increasing inductor current for one level of load voltage from the beginning of each cycle of said clocking signal until the inductor current equals said threshold current during each cycle, and (2) decreasing inductor current for the other level of voltage from the time in each cycle the current equals said threshold current until the end of each said cycle; and wherein said means for generating said threshold current generates said threshold current as a function of said load and supply voltages so that said predetermined slope and level of the threshold current is a desired steady state solution of said decreasing inductor current so that any perturbations of said inductor current immediately converges to the steady state waveform at the time in each cycle the current equals the threshold current.

2. A converter circuit according to claim 1, wherein said means for generating said threshold current includes a ramp generator for generating a negative sloping ramp signal at a slope equal to the slope of the negative portion of the steady state waveform of the inductor current.

3. A converter circuit according to claim 2, wherein said ramp generator is responsive to said clocking signal so as to reset at the beginning of each period of clocking signal.

4. A converter circuit according to claim 3, wherein said slope of said negative sloping ramp signal is a function of and is responsive to at least one supply voltage and said load voltage.

5. A converter circuit according to claim 4, wherein said negative sloping ramp signal is a function of said supply and load voltages so that said ramp signal provides a threshold current and the average inductor current through said inductance means remains substantially constant as a function of said supply and load voltages.

6. In a switching converter circuit operable in a current control mode for controlling the dynamic waveform and average value of a baseband current provided to a load, said circuit comprising:

(a) clocking means for generating a clocking signal at a predetermined frequency;

(b) switching means for selectively coupling each of a plurality of voltage sources to said load so that said baseband current is applied to and a load voltage is applied across said load; and (c) control means for operating said switching means in synchronism with said clocking signal so that said plurality of source voltages are connected to said load in a sequence during each cycle of said clocking signal so as to create the dynamic waveform of said baseband current so that the actual dynamic waveform of said baseband current is forced to and maintained as a desired dynamic waveform having said average value and determined as a function of one or more operating parameters whose values affect the actual dynamic waveform of said baseband current.

7. A circuit according to claim 6, further including filter means, disposed between said switching means and said load, for filtering the output of said switching means so as to provide said baseband current.

8. A circuit according to claim 7, wherein said filter means includes an inductor.

9. A circuit according to claim 6, wherein said control means includes: (i) means for calculating values related to said desired dynamic waveform of said baseband current as a function of the present values of said parameters; (ii) signal generation means for generating a signal representative of said desired dynamic waveform as a function of said calculated values; (iii) means for sensing the actual dynamic waveform; and (iv) means for generating a control signal for controlling said switching means as a function of the difference between the desired dynamic waveform and the actual dynamic waveform so that said actual dynamic waveform is force to and conforms with said desired dynamic waveform.

10. A circuit according to claim 9, wherein the parameters are the source and load voltages, and said means for calculating said desired dynamic waveform includes means for determining the present levels of said source and load voltages.

11. A circuit according to claim 9, wherein said means for generating a control signal for controlling said switching means generates said control signal so that said actual dynamic waveform is forced to and conforms with said desired waveform within a cycle of said clocking signal.

* * * * *